March 3, 1970     A. MASON     3,498,091
PRESSURE RESPONSIVE SWITCH HAVING AUTOMATIC RESET MEANS
Filed June 7, 1968     3 Sheets-Sheet 1

INVENTOR.
ANTHONY MASON
BY *Hill, Sherman, Meroni, Gross & Simpson* ATTORNEYS

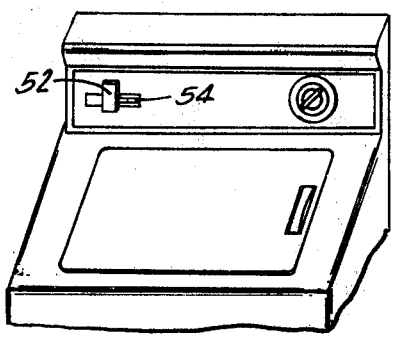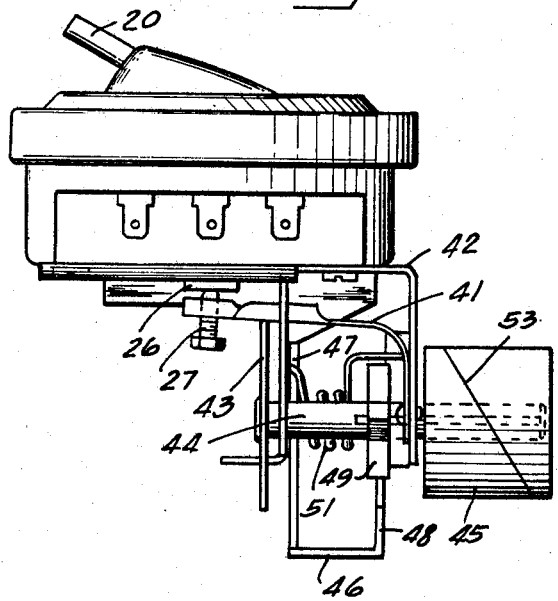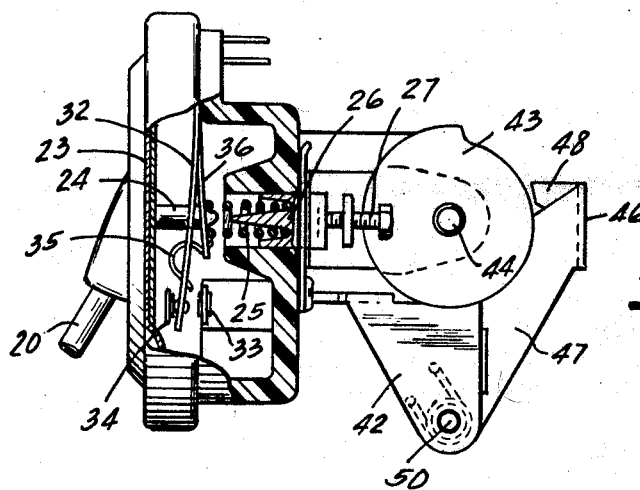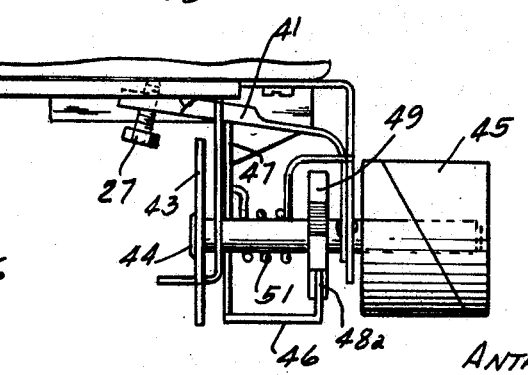

March 3, 1970 A. MASON 3,498,091
PRESSURE RESPONSIVE SWITCH HAVING AUTOMATIC RESET MEANS
Filed June 7, 1968 3 Sheets-Sheet 3
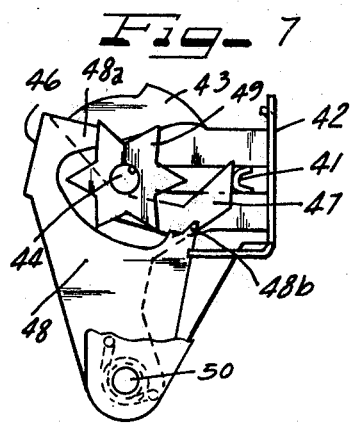
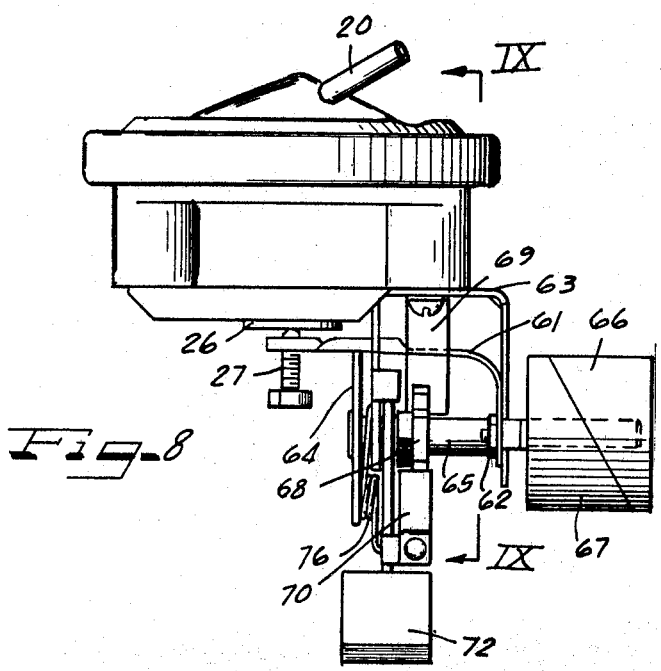
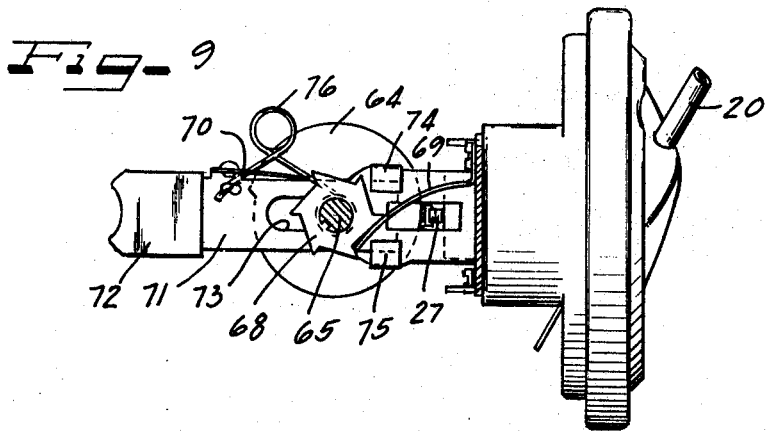
INVENTOR.
ANTHONY MASON United States Patent Office 3,498,091
Patented Mar. 3, 1970

3,498,091
PRESSURE RESPONSIVE SWITCH HAVING AUTOMATIC RESET MEANS
Anthony Mason, Benton Harbor, Mich., assignor to Whirlpool Corporation, Benton Harbor, Mich., a corporation of Delaware
Filed June 7, 1968, Ser. No. 735,270
Int. Cl. D06f 33/02; H01h 35/40
U.S. Cl. 68—207                                                    11 Claims

ABSTRACT OF THE DISCLOSURE

A pressure responsive switch assembly of the type employed in washing machines provided with an automatic reset mechanism, whereby the water level at which the pressure responsive switch operates can be selectively modified and wherein the pressure switch will be simultaneously reset thereby necessitating only a single actuating movement.

BACKGROUND OF THE INVENTION

Field of the invention

The present invention is in the field of pressure responsive switches of the type employing a flexible diaphragm which is exposed to the pressure conditions to be sensed and whose flexure serves to operate a switch arm between a pair of contacts. As used in the washing machine art, this type of switch is exposed to differences in the pressure of a column of air resulting from filling the laundry tub with water, the switch arm functioning to terminate introduction of the water after the required level has been reached, and functioning by engaging a different contact, to initiate operation of the motor which drives the agitator in the washing machine assembly.

Description of the prior art

A type of pressure responsive switch which is commonly employed in washing machine assemblies is illustrated in Main, U.S. Patent No. 3,291,932. This patent describes several types of reset mechanisms which involve either a push-to-reset or a pull-to-reset structure.

Unfortunately, it is difficult to educate the user of a washing machine that there is something more to setting a liquid level in the laundry tub other than adjusting a dial. In many cases, the user will preselect a liquid level of the tub and find after the level has been reached, that it is thought to be insufficient. When the user then attempts to move the liquid level of the dial on the washer to a higher level, and finds that nothing happens, the immediate reaction is that the controls are defective and a service man is called.

The present invention overcomes this difficulty by providing an automatic reset means which resets the pressure responsive switch as an incident in changing the liquid level. Consequently, the user no longer has to go through a separate resetting operation before selecting a different liquid level at which the pressure sensitive switch becomes responsive.

SUMMARY OF THE INVENTION

The present invention provides a pressure responsive switch assembly which includes a fluid pressure responsive diaphragm and a switch arm operated by movement of the diaphragm between a pair of contacts. As customary from the prior art, biasing means are provided for applying a variable biasing force on the diaphragm in opposition to the fluid pressure acting thereon, to thereby adjust the operating level at which the switch arm moves from one contact to the other. In accordance with the present invention, an actuator means is provided to operate on the biasing means to thereby move the diaphragm from a position in which the switch arm engages one of the contacts to a reset position in which it engages the other contact. Indexing means are further provided which are operated by movement of the actuator means to incrementally vary the biasing force provided by the biasing means so that a single movement of the actuator means is effective to both move the switch into a reset position and to vary the biasing force provided by the biasing means.

BRIEF DESCRIPTION OF THE DRAWINGS

FIGURE 3 is a fragmentary view of the front of a washing machine employing the pressure responsive switch of the present invention;

FIGURE 4 is a plan view of one form of a pressure responsive switch in accordance with the present invention;

FIGURE 5 is a side elevational view of the form of the invention shown in FIGURE 4, with portions thereof being broken away to illustrate the interior construction;

FIGURE 6 is a partial plan view of the improved switch assembly illustrating the position of the elements during the resetting operation;

FIGURE 7 is another side elevational view taken on the opposite side from FIGURE 5;

FIGURE 8 is a plan view of a modified form of a pressure responsive switch in accordance with the present invention; and FIGURE 9 is a cross-sectional view taken substantially along the line IX—IX of FIGURE 8.

DESCRIPTION OF THE PREFERRED EMBODIMENTS

Figure 1:
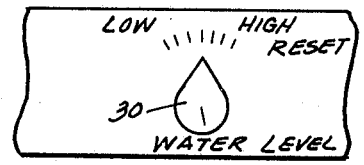
FIGURE 1 is a somewhat schematic view of the pressure responsive switch assembly as it has been employed in prior art washing machine assemblies.
Figure 1:
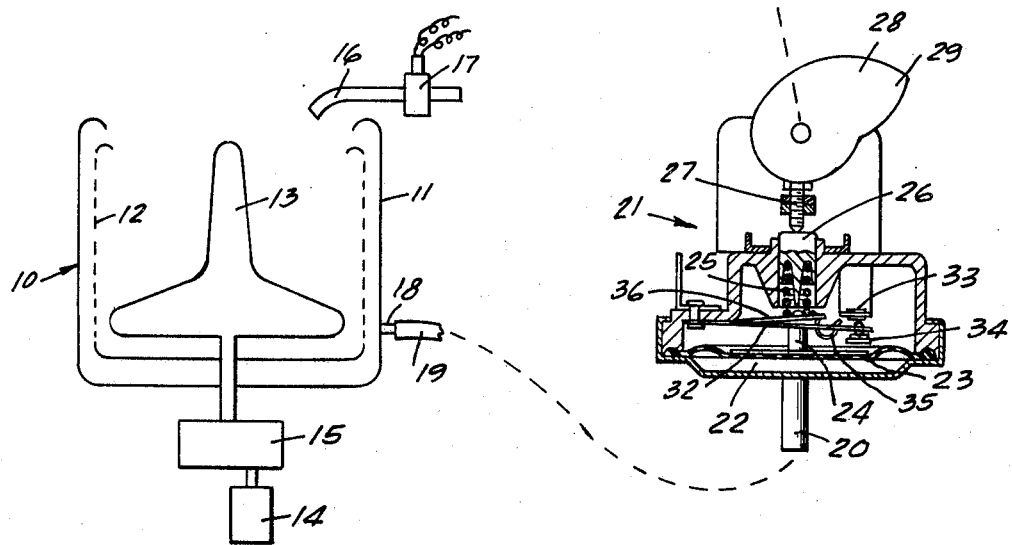

In the schematic showing of FIGURE 1, reference numeral 10 indicates generally a washing machine including an imperforate tub 11 in which there is disposed a perforate, rotatable basket 12. A centrally mounted agitator 13 is driven in an oscillatory fashion by means of a motor 14 acting through a transmission 15. A water inlet conduit 16 supplies water to the tub 11 and is under the control of a solenoid operated valve 17.

An outlet port 18 near the bottom of the tub 11 is connected by means of a flexible tube 19 to an inlet port 20 of a pressure responsive switch assembly generally indicate at numeral 21. As the fluid level in the tube 11 rises, air in the conduit 19 is compressed, enters a chamber 22 where it acts upon a flexible diaphragm 23. A post 24 acts on the rear of the diaphragm 23 in opposition to the fluid pressure acting on it in the chamber 22. The post 24 is biased against the diaphragm 23 by a compression spring 25. The spring 25 is preloaded by means of a plunger 26, the pressure thereon being determined by a follower screw 27 which engages the plunger 26 and is varied by a cam 28. The relative position of the plunger 26 within the switch assembly and hence the amount of preloading acting against the diaphragm 23 is determined by the relative position of the cam and varies from a low point on the cam to a high point 29 at which maximum pressure is exerted. The position of the cam 28 relative to the follower screw 27 is determined by a control knob 30 on the console of the washing machine, the control knob 30 being coupled to the cam 28 through a mechanical linkage generally indicated at numeral 31 in the drawings. Thus, if the control knob 30 is set at a high water level position the cam 28 biases the plunger 26 to a low position, with a relatively high portion of the cam 28 riding on the follower 27. In this position, the spring 25 exerts a strong force on the diaphragm 23 by means of the post 24. It then requires a high degree of air compression in the chamber 22 to overcome the biasing force. At the other extreme, when the cam 28 engages the follower 27 at its low point, a relatively small amount of air pressure in the chamber 22 will be effective to move the diaphragm 23.

The diaphragm 23 controls the position of a switch arm 32 mounted in cantilever fashion within the switch housing. The switch arm 32 is arranged to move between a pair of stationary contacts 33 and 34, depending on the position of the diaphragm 23. A "C" spring 35 acts as a toggle spring, and has one end connected to a center tongue 36 of the switch arm 32. Upon movement of the post 24 caused by flexure of the diaphragm, the "C" spring 35 is moved into an over-center position, causing a toggle action to occur in moving the switch arm 32 from contact 33 to contact 34.

Figure 2:
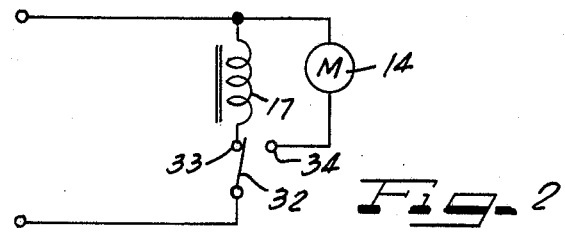
FIGURE 2 is a wiring diagram illustrating more completely the function of the switch assembly.

The electrical circuit for the switch assembly is shown in FIGURE 2 of the drawings. With the tub 11 empty, the switch arm 32 of the pressure switch engages contact 33, thereby closing the circuit to the solenoid operated valve 17 which, in turn, permits water to enter the tub through the inlet conduit 16. After the water lever in the tub reaches a height determined by the setting of the control knob 30, the diaphragm 23 is deflected enough to cause the switch arm 32 to shift from contact 33 to contact 34, thereby energizing the motor 14 and de-energizing the solenoid operated valve 17. Thus, water introduction is terminated and the agitator 13 begins to operate.

Normally, the control knob 30 will be set at some position which is intermediate the low and high level points. After the tub 11 has been filled to the predetermined level, further additions of water cannot be made until the switch arm 32 is reset so that it is in contact with the contact 33. To accomplish this, it is necessary to move the control knob 30 to the "reset" position, whereupon the high point 29 of the cam 28 engages the follower 27 forcing the plunger 26 to its extreme lowermost position, thereby flexing the diaphragm 23 to the bottom of the chamber 22. This amount of movement is sufficient to snap the spring 35 back over center and the switch arm 32 thereby moves from contact 34 to contact 33 permitting the solenoid operated valve 17 to again become operative. Then, the operator can move the control knob 30 to a higher position and change the maximum water level in the tub.

The pressure responsive switch of the present invention is so designed as to eliminate the need for the separate reset operation, and provides a mechanism in which resetting is accomplished contemporaneously with the adjustment of the control to a new operating point.

Turning now to FIGURES 3 to 7, inclusive, of the drawings, a first form of the invention is illustrated in which the incremental indexing of the biasing means, the plunger 26 and the spring 25 is accomplished after the reset operation has occurred, both actions being effected by a single straight-line movement of an actuating mechanism. In the interest of simplicity, the reference numerals applied to the conventional portions of the pressure responsive switch are the same as those used in the description of FIGURE 1.

In FIGURE 4, it will be seen that the follower screw 27 is mounted on a resilient spring arm 41 which is anchored to a support bracket 42. A cam 43 has its periphery riding on the support arm 41 to adjust the amount of pressure exerted on the plunger 26. The cam 43 is secured to a shaft 44 which extends through the support bracket 42 and has an indicating cylinder 45 secured to the free end of the shaft.

The actuator shown in this form of the invention takes the form of a rocker arm assembly having a flat face 46 and two angularly disposed arms extending therefrom, one arm 47 having an end portion engaging the resilient support arm 41, and the other arm 48 acting as a pawl to incrementally rotate a ratchet such as a star wheel 49 mounted on the shaft 44. The arms 47 and 48 are pivotally mounted relative to the mounting bracket 42 by the provision of a pin 50.

As best illustrated in FIGURE 7 of the drawings, the arm 48 has two pawl portions consisting of a forward pawl portion 48a and a rearward pawl portion 48b, the forward portion 48a functioning to position the star wheel 49 upon inward movement of the rocker arm assembly so that the rearward pawl 48b will index the star wheel 49 through one increment by the action of a coil spring 51 contained around the shaft 44.

The operation of the device shown in FIGURES 4 to 7 will be apparent from the foregoing discussion. When it is desired to reset the pressure responsive switch and index it to the next higher water level position, an operator pushes on a slide 52 extending from the console of the washing machine (FIGURE 3) causing the arms 47 and 48 to be pivoted about the pin 50. The arm 47 thereupon lifts the resilient support arm 41 from engagement with the periphery of the cam 43, as illustrated in FIGURE 6. At the same time, the forward pawl 48a may rotate the star wheel 49 a small amount to put it in position for engagement with the rearward pawl 48b. The movement of the follower 27 is then sufficient to cause the post 24 to flex the diaphragm 23 sufficiently to cause the switch arm 32 to move from contact with the contact 34 and into contact wtih the contact 33 through the toggle action of the spring 35. When pressure is released on the rocker arm, the spring 51 returns the rocker arm to its initial position and in doing so, the rearward pawl 48b engages the star wheel 49 and indexes it to the next higher increment of pressure. This simultaneously causes the indicator wheel 45 to rotate through a small arc, depending upon the number of points on the star wheel 49. A water level line 53 indicates the relative setting of water in the tub and is visible to the operator through a sight glass 54 on the console of the machine. When the rocker arm returns to the position shown in FIGURE 4, the resilient support arm 41 again rests on the periphery of the cam 43 except that the cam 43 through the rotation of the shaft 44 now exerts a greater pressure on the support arm 44 and a higher point on the cam 43 now rides against the support arm 41.

In the form of the invention shown in FIGURES 8 and 9, the screw follower 27 is urged against the plunger 26 by the resilience of a flexible support arm 61 which has one end secured as by means of a nut and bolt assembly 62 to a support bracket 63. A cam 64 has its periphery engaging the flexible support arm 61 and urges the follower 27 against the plunger 26 with a predetermined pressure, depending upon the relative position of the cam 64. The cam is mounted for rotation on a shaft 65 which also carries an indicating cylinder 66 having a water level line 67 thereon. A star wheel 68 is keyed or otherwise secured to the shaft 65. A leaf spring 69 is arranged to engage each of the points on the star wheel as indicated in FIGURE 9 to prevent rotation in the opposite direction, and a second leaf spring 70 is mounted on a slide 71 and serves to index the star wheel 68 incrementally, thereby rotating the cam 64 through a predetermined arc. The slide 71 is provided with an operating push button 72 and has a slot 73 therein of sufficient width to clear the shaft 65. A pair of ears 74 and 75 are provided to guide the movement of the slide 71 through a straight-line path. Accordingly, when the push button 72 is pushed inwardly, the leaf spring 70 engages the star wheel 68 and rotates it and the cam 64 through a predetermined arc, and then the end of the slide 71 engages the flexible support arm 61 causing the plunger 26 to move inwardly to its maximum extent, thereby resetting the switch arm 32 in the pressure responsive switch assembly. The slide 71 is returned to its original position by a spring 76 which has one end secured to the slide 71 and its opposite end secured to the shaft 65.

With the types of structures described, the use of a full 360° cam surface to adjust the operating point of the pressure switch allows more precise setting thereof than previously used structures. Furthermore, presetting of the water level desired in incremental steps as accomplished in the present invention gives the user a feeling of having positively set the level which was not true in prior art systems lacking a detent mechanism as part of the control system.

It should be evident that various modifications can be made to the described embodiments without departing from the scope of the present invention.

The embodiments of the invention in which an exclusive property or privilege is claimed are defined as follows:

1. In a pressure responsive switch assembly including a fluid pressure responsive diaphragm,
switch arm operated by movement of said diaphragm,
a pair of contacts selectively engageable by said switch arm depending on the position of said diaphragm, and
biasing means for applying a variable biasing force on said diaphragm in opposition to the fluid pressure acting thereon, the improvement which comprises
    actuator means operating on said biasing means and arranged to move said diaphragm from a position in which said switch arm engages one of said contacts to a reset position in which it engages the other of said contacts, and
indexing means operated by movement of said actuator means to incrementally vary the biasing force provided by said biasing means,
whereby a single movement of said actuator means is effective to both move sad switch arm into a reset position and to vary the biasing force provided by said biasing means.

2. The switch assembly of claim 1 in which said biasing means includes a cam, said indexing means includes a ratchet arranged to rotate said cam and said actuator means has an arm which engages said ratchet to rotate the same through a predetermined arc upon movement of said actuator means to the reset position.

3. The switch assembly of claim 2 in which said arm rotates said ratchet before said actuator means reaches the reset position.

4. The switch assembly of claim 2 in which said arm rotates said ratchet after said actuator means has reached the reset position.

5. The switch assembly of claim 1 which also includes indicating means operated by said actuator means to provide an indication of the biasing force provided by said biasing means.

6. A washing machine comprising
a tub,
inlet means for introducing water into said tub,
solenoid means controlling operation of said inlet means,
an agitator disposed in said tub,
a motor arranged to drive said agitator,
an adjustable pressure responsive switch arranged to sense the level of liquid in said tub,
    said pressure responsive switch including a switch arm,
    a pair of contacts selectively engageable by said switch arm, the engagement of said switch arm with one of said contacts in a first position functioning to energize said solenoid means and introduce water into said tub, the engagement of said switch arm with the other of said contacts in a second position functioning to deenergize said solenoid means and energize said motor,
a diaphragm responsive to the liquid level in said tub and arranged to move said switch arm into one of said two positions,
biasing means acting on said diaphragm to set the operating point at which said arm engages said one or said other of said contacts,
indexing means acting on said biasing means to incrementally adjust said operating point, and
an actuator means movable into engagement with said biasing means and with said indexing means during a single stroke thereof to concurrently move said switch arm from said second to said first position and to operate said indexing means to readjust said operating point of said switch arm.

7. The washing machine of claim 6 in which said indexing means includes a cam engaging said biasing means, and a ratchet coaxial with said cam and engageable by said actuator means.

8. The washing machine of claim 7 in which said biasing means includes a spring arm on which said cam rides.

9. The washing machine of claim 6 in which said actuator means comprises a spring-biased slide.

10. The washing machine of claim 6 in which said actuator means comprises a pivotally mounted rocker arm.

11. The washing machine of claim 8 in which said actuator means comprises a spring-biased slide which engages said spring arm to move said switch arm from said first to said second position.

References Cited

UNITED STATES PATENTS

| 3,248,909 | 5/1966 | Knerr | 68—12 |
| 3,291,932 | 12/1966 | Main | 200—83 |
| 3,315,053 | 4/1967 | Bauer | 200—83 |
| 3,340,373 | 9/1967 | Bello | 200—83 |
| 3,366,760 | 1/1968 | Kolze et al. | 200—83 |

WILLIAM I. PRICE, Primary Examiner

U.S. Cl. X.R.
137—387, 453; 200—83; 307—118